(12) United States Patent
Price et al.

(10) Patent No.: US 11,702,108 B2
(45) Date of Patent: Jul. 18, 2023

(54) DISTRIBUTED COMPUTING SYSTEMS FOR AUTONOMOUS VEHICLE OPERATIONS

(71) Applicant: TUSIMPLE, INC., San Diego, CA (US)

(72) Inventors: Charles A. Price, San Diego, CA (US); Zehua Huang, San Diego, CA (US); Xiaoling Han, San Diego, CA (US); Ruiliang Zhang, San Diego, CA (US); Xiaodi Hou, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 432 days.

(21) Appl. No.: 17/019,135

(22) Filed: Sep. 11, 2020

(65) Prior Publication Data

US 2021/0078600 A1 Mar. 18, 2021

Related U.S. Application Data

(60) Provisional application No. 62/901,115, filed on Sep. 16, 2019, provisional application No. 62/901,123, (Continued)

(51) Int. Cl.
*B60W 60/00* (2020.01)
*B60W 30/095* (2012.01)
(Continued)

(52) U.S. Cl.
CPC .... *B60W 60/0017* (2020.02); *B60W 30/0956* (2013.01); *B60W 60/0027* (2020.02);
(Continued)

(58) Field of Classification Search
CPC ......... B60W 2420/42; B60W 2420/52; B60W 2510/0604; B60W 2510/1005; B60W 2510/18; B60W 2510/20; B60W 2554/20; B60W 2554/4041; B60W 2554/4044; B60W 30/0956; B60W 60/001; B60W 60/0017; B60W 60/0027; B60W 2720/24; B60W 30/18163; B60W 2554/00; B60W 2554/80; B60W 2556/60; B60W 2754/30; G01C 21/3407; G01C 21/3815; G08G 1/143; G08G 1/16; G08G 1/165; G08G 1/166; G08G 1/167; G05D 1/0214; G05D 1/024; G05D 1/0246; G05D 1/0257;
(Continued)

(56) References Cited

U.S. PATENT DOCUMENTS 9,523,984 B1 * 12/2016 Herbach ............... B60W 10/18
10,449,962 B2 * 10/2019 Saigusa ................ B60W 50/04
(Continued)

*Primary Examiner* — Babar Sarwar
(74) *Attorney, Agent, or Firm* — Paul Liu; Glenn Theodore Mathews; Perkins Coie, LLP

(57) ABSTRACT

Disclosed are distributed computing systems and methods for controlling multiple autonomous control modules and subsystems in an autonomous vehicle. In some aspects of the disclosed technology, a computing architecture for an autonomous vehicle includes distributing the complexity of autonomous vehicle operation, thereby avoiding the use of a single high-performance computing system and enabling off-the-shelf components to be use more readily and reducing system failure rates.

20 Claims, 8 Drawing Sheets

Related U.S. Application Data filed on Sep. 16, 2019, provisional application No. 62/900,436, filed on Sep. 13, 2019.

(51) Int. Cl.
*G08G 1/14* (2006.01)
*G08G 1/16* (2006.01)
*G01C 21/00* (2006.01)

(52) U.S. Cl.
CPC ......... *G01C 21/3815* (2020.08); *G08G 1/143* (2013.01); *G08G 1/16* (2013.01); *B60W 2420/42* (2013.01); *B60W 2420/52* (2013.01); *B60W 2510/0604* (2013.01); *B60W 2510/1005* (2013.01); *B60W 2510/18* (2013.01); *B60W 2510/20* (2013.01); *B60W 2554/20* (2020.02); *B60W 2554/4041* (2020.02); *B60W 2554/4044* (2020.02)

(58) Field of Classification Search
CPC ................ G05D 1/027; G05D 1/0278; G05D 2201/0213; B62D 15/0255; F16L 37/127; F16L 37/20; F16L 37/30; H01R 24/38; F24F 1/26
See application file for complete search history.

(56) References Cited

U.S. PATENT DOCUMENTS

| | | | |
|---|---|---|---|
| 11,358,599 B2* | 6/2022 | Oka | B60W 30/0956 |
| 11,420,622 B2* | 8/2022 | Ikezawa | B60W 10/18 |
| 11,449,060 B2* | 9/2022 | Kanoh | B60W 50/14 |
| 11,518,381 B2* | 12/2022 | Miller | B60W 10/04 |
| 2017/0057510 A1* | 3/2017 | Herbach | B60W 30/181 |
| 2019/0071093 A1* | 3/2019 | Ma | B60W 30/18163 |
| 2019/0236950 A1* | 8/2019 | Li | G08G 1/096741 |
| 2019/0325325 A1* | 10/2019 | Monteil | G08G 1/096844 |

* cited by examiner

DISTRIBUTED COMPUTING SYSTEMS FOR AUTONOMOUS VEHICLE OPERATIONS

PRIORITY CLAIMS AND RELATED PATENT APPLICATIONS

This patent document claims the priority to and the benefits of U.S. Provisional Application No. 62/900,436 entitled "DISTRIBUTED COMPUTING SYSTEMS FOR AUTONOMOUS VEHICLE OPERATIONS" filed on Sep. 13, 2019; U.S. Provisional Application No. 62/901,115 entitled "HIGH PRECISION AUTONOMOUS VEHICLE DRIVING SYSTEM" filed on Sep. 16, 2019; and U.S. Provisional Application No. 62/901,123 entitled "TECHNIQUES FOR SOFTWARE-BASED CONTROL OF AUTONOMOUS VEHICLES" filed on Sep. 16, 2019. The entire disclosures of the aforementioned applications are hereby incorporated by reference as part of the disclosure of this application.

TECHNICAL FIELD

This document relates to systems, apparatus, and methods for controlling autonomous vehicles.

BACKGROUND

Autonomous vehicle navigation is a technology that can allow a vehicle to sense the position and movement of vehicles around an autonomous vehicle and, based on the sensing, control the autonomous vehicle to safely navigate towards a destination. An autonomous vehicle may operate in several modes. In some cases, an autonomous vehicle may allow a driver to operate the autonomous vehicle as a conventional vehicle by controlling the steering, throttle, clutch, gear shifter, and/or other devices. In other cases, a driver may engage the autonomous vehicle navigation technology to allow the vehicle to be driven by itself

SUMMARY

This patent document describes systems, apparatus and methods for controlling operation of autonomous navigation.

In an example embodiment, a system for autonomous vehicle operation comprises at least two computers. A first computer comprising a first processor is configured to perform a first set of operations, where the first processor is configured to: receive, from a camera located on an autonomous vehicle, an image of an area towards which the autonomous vehicle is driven; receive, from a light detection and ranging (LIDAR) located on the autonomous vehicle, point cloud data of the area; determine, at least from the image and the point cloud data, locations of moving objects and static obstacles in the area; and determine, based on a stored map and the locations of the static obstacles, a drivable region in the area, wherein the drivable region indicates a region where the autonomous vehicle is allowed to be driven. A second computer comprising a second processor configured to perform a second set of operations, where the second processor is configured to: determine, based at least on the drivable region and the locations of the moving objects, a trajectory information for the autonomous vehicle; and send, to at least one device located in the autonomous vehicle, an instruction comprising one or more values that are determined based at least on the trajectory information, and wherein the autonomous vehicle is driven according to the trajectory information based on the instruction sent to operate the at least one device.

The following features can be part of the system in any reasonable combination. In some embodiments, the second processor of the second computer is configured to determine, based on the trajectory information and based on a location and an orientation of the autonomous vehicle, the one or more values (e.g., a braking amount, steering angle, and/or other value(s)) for operating at least one device located in the autonomous vehicle. In some embodiments, the first processor of the first computer is further configured to: receive, from a second camera located on the autonomous vehicle, a second image of at least part of the area; determine that a first set of one or more moving objects or one or more static obstacles from the image is the same a second set of one or more moving objects or one or more static obstacles from the second image; and combine the first set and the second set, wherein the moving objects and static obstacles comprise a combination of the first set and the second set. In some embodiments, the second processor of the second computer is further configured to: track a location of at least one moving object based on a detection of the at least one moving object in the received image and one or more additional images received from the camera, wherein the one or more additional images are received in time after the image is received.

In some embodiments, the first processor of the first computer and the second processor of the second computer are configured to perform respective operations based on an autonomous driving software model that assigns the first set of operations to the first computer and the second set of operations to the second computer. In some embodiments, the second processor of the second computer is further configured to: determine a motion pattern of at least one moving object after the image is received from the camera, wherein the motion pattern indicates a predicted trajectory of the at least one moving object based at least on a determination of speeds and directions of movement of the moving objects. In some embodiments, the second processor of the second computer is further configured to: determine an area next to the road to safely park the autonomous vehicle in case of an emergency.

In some embodiments, the second set of operations further include: determining motion patterns of the moving objects over a pre-determined length of time after the image is received from the camera, wherein the motion patterns indicates predicted trajectories of the moving objects based on: detecting the moving objects in the received image, and determining speeds and directions of movement of the moving objects. In some embodiments, the second set of operations further include: assigning, to the moving objects, situational tags that describe the motion patterns of the moving objects. In some embodiments, at least one situation tag for at least one moving object includes a speed of the at least one moving object and a location of the at least one moving object. In some embodiments, at least one situation tag for at least one moving object includes an indication of whether the at least one moving object is speeding up or slowing down. In some embodiments, the trajectory for the autonomous vehicle is determined based on the drivable region, the locations of the moving objects, one or more attributes of the moving objects, the situational tags for the moving objects, and the locations of the static obstacles.

In some embodiments, the trajectory information is filtered by applying a filter to the trajectory information. In some embodiments, the filter includes a Kalman filter configured to minimize noise in the trajectory information. In some embodiments, the one or more values determined based at least on the trajectory information includes determining a steering angle of a steering of the autonomous vehicle. In some embodiments, the one or more values determined based at least on the trajectory information includes determining a throttle amount for an engine of the autonomous vehicle. In some embodiments, the one or more values determined based at least on the trajectory information includes determining a transmission gear for a transmission of the autonomous vehicle. In some embodiments, the one or more values determined based at least on the trajectory information includes determining a braking amount of brakes of the autonomous vehicle.

A method of autonomous driving operation according to some embodiments described herein includes performing a first set of operations by a first computer and a second set of operations by a second computer. The first set of operations includes receiving, from a camera located on an autonomous vehicle, an image of an area towards which the autonomous vehicle is driven. The first set of operations also includes receiving, from a light detection and ranging (LIDAR) system located on the autonomous vehicle, point cloud data of the area. The first set of operations further includes determining, at least from the image and the point cloud data, locations of moving objects and static obstacles in the area. The first set of operations includes determining, based on a stored map and the locations of the static obstacles, a drivable region of the area, wherein the drivable region indicates a region where the autonomous vehicle is allowed to be driven. The second set of operations includes determining, based at least on the drivable region and the locations of the moving objects, a trajectory information for the autonomous vehicle. The second set of operations also includes sending, to at least on one device located in the autonomous vehicle, an instruction comprising one or more values that are determined based at least on the trajectory information, and wherein the autonomous vehicle is driven according to the trajectory information based on the instruction sent to operate the at least one device.

The following features may be part of the method in any reasonable combination. The second set of operations may further include: determining motion patterns of the moving objects over a pre-determined length of time after the image is received from the camera, wherein the motion patterns indicates predicted trajectories of the moving objects based on: detecting the moving objects in the received images, and determining speeds and directions of movement of the moving objects. The second set of operations may further include assigning, to the moving objects, situational tags that describe the motion patterns of the moving objects. In such methods, at least one situation tag for at least one moving object includes a speed of the at least one moving object and a location of the at least one moving object. Alternatively, or additionally, the at least one situation tag for at least one moving object includes an indication of whether the at least one moving object is speeding up or slowing down. The trajectory for the autonomous vehicle is determined based on the drivable region, the locations of the moving object, one or more attributes of the moving objects, the situation tags for the moving objects, and the locations of the static obstacles.

A non-transitory computer readable program computer readable program storage medium is described herein that has code stored thereon, such that the code, when executed by a processor, causes the processor to implement a method that includes performing a first set of operations by a first computer and a second set of operations by a second computer. The first set of operations includes receiving, from a camera located on an autonomous vehicle, an image of an area towards which the autonomous vehicle is driven. The first set of operations also includes receiving, from a light detection and ranging (LIDAR) system located on the autonomous vehicle, point cloud data of the area. The first set of operations further includes determining, at least from the image and the point cloud data, locations of moving objects and static obstacles in the area. The first set of operations includes determining, based on a stored map and the locations of the static obstacles, a drivable region of the area, wherein the drivable region indicates a region where the autonomous vehicle is allowed to be driven. The second set of operations includes determining, based at least on the drivable region and the locations of the moving objects, a trajectory information for the autonomous vehicle. The second set of operations also includes sending, to at least on one device located in the autonomous vehicle, an instruction comprising one or more values that are determined based at least on the trajectory information, and wherein the autonomous vehicle is driven according to the trajectory information based on the instruction sent to operate the at least one device.

The following features may be present in the non-transitory computer readable program storage medium in any reasonable combination. The trajectory information may be filtered by applying a filter to the trajectory information. The filter may include a Kalman filter configured to minimize noise in the trajectory information. The one or more values determined based at least on the trajectory information includes determining a steering angle of a steering of the autonomous vehicle. The one or more values determined based at least on the trajectory information includes determining a throttle amount for an engine of the autonomous vehicle. The one or more values determined based at least on the trajectory information may include determining a transmission gear for a transmission of the autonomous vehicle. The one or more values determined based at least on the trajectory information may include determining a braking amount of brakes of the autonomous vehicle.

The above and other aspects and their implementations are described in greater detail in the drawings, the descriptions, and the claims.

DETAILED DESCRIPTION

Autonomous vehicles can have multiple control systems working integrally and/or independently to control various modules and subsystems of the vehicle, such as the drivetrain, power steering, vehicle sensors (e.g., engine temperature sensor, oil pressure sensor, etc.), environmental sensors to perceive the surroundings (e.g., RADAR, LIDAR, SONAR, inertial measurement units including accelerometers and/or rate sensors, etc.), braking system, and other modules and subsystems. These modules and subsystems can be diverse in their computing architecture due to various factors, such as input and output volumes and speeds, processing requirements, and amount of interconnectivity with other modules or subsystems.

Such diversity can create large complexities in integrating each module and subsystem to operate synchronously for safe and reliable autonomous control of the vehicle. For example, under a centralized computing architecture, any failure or error in the central processing system may propagate throughout the computing architecture manifesting further errors that could threaten the control of one or more modules and subsystems, and thereby create significant risk to safe operation of the autonomous vehicle. Therefore, it would be beneficial to have a distributed computing architecture for autonomous vehicles.

This patent document discloses distributed computing systems and methods for controlling multiple autonomous control modules and subsystems in an autonomous vehicle. In some aspects of the disclosed technology, a computing architecture for an autonomous vehicle includes distributing the complexity of autonomous vehicle operation, thereby avoiding the use of a single high-performance computing system and enabling off-the-shelf (OTS) components to be use more readily and reducing system failure rates. The distributed computing systems and methods are described in three sections. Section I provides an overview of the distributed computing systems and methods. Sections II an example of autonomous driving operations that can be performed on the distributed computing systems disclosed herein. Section III describes an example process to obtain autonomous driving software that can operate on a distributed computing system disclosed herein. The example headings for the various sections below are used to facilitate the understanding of the disclosed subject matter and do not limit the scope of the claimed subject matter in any way. Accordingly, one or more features of one example section can be combined with one or more features of another example section.

I. Overview of Distributed Computing Systems and Methods

Figure 1:
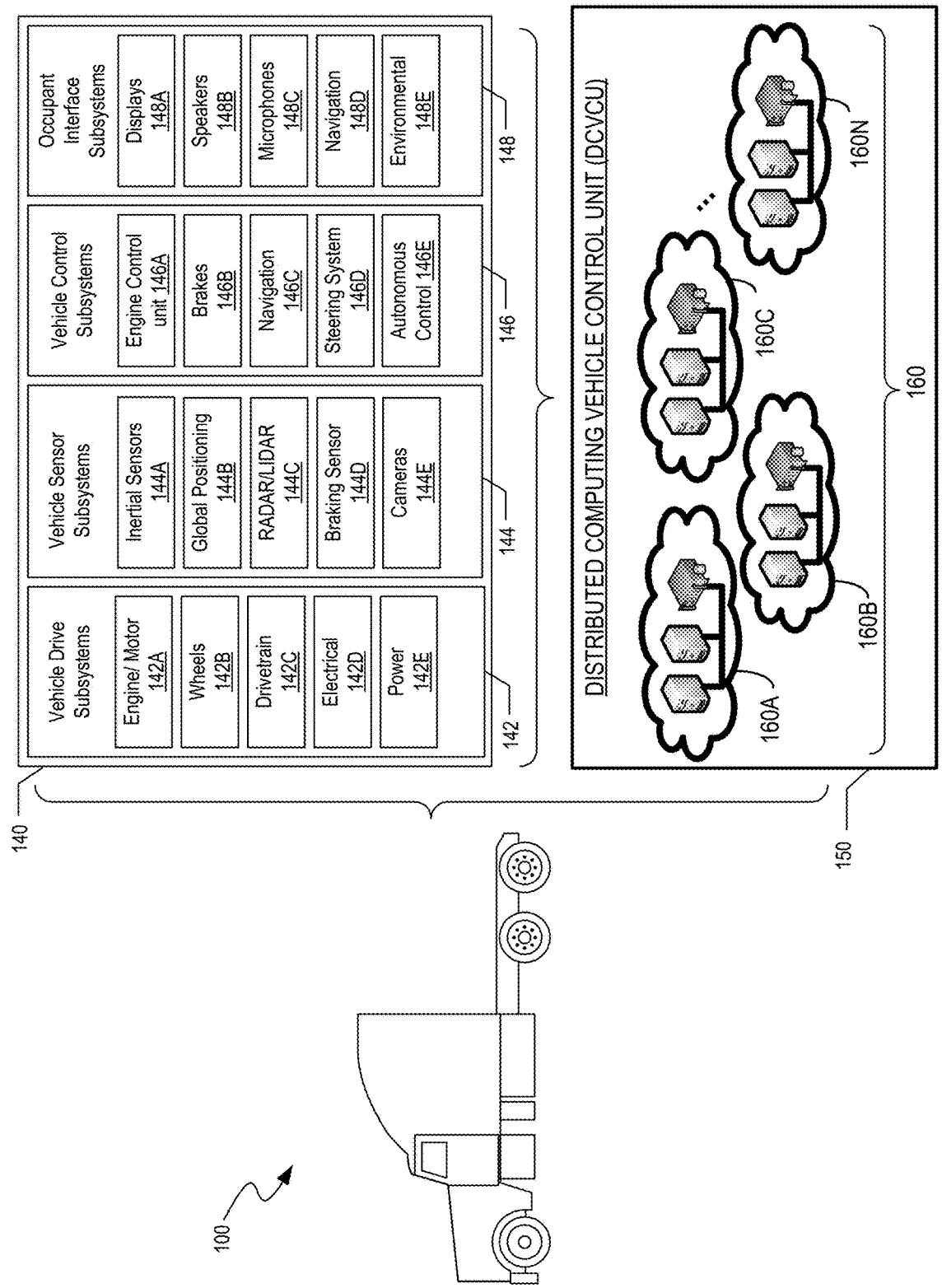
FIG. 1 shows a diagram of an example autonomous vehicle, embodied as a semi-trailer truck (also referred to as a tractor-trailer), equipped with control systems for autonomous functionalities.

FIG. 1 shows a diagram of an example autonomous vehicle 100, embodied as a semi-trailer truck (also referred to as a tractor-trailer), equipped with control systems for autonomous functionalities, such as a driving system, a steering system, a braking system and a sensor-based perception system installed on the autonomous vehicle 100. These control systems for autonomous functionalities are in communication with self-driving subsystems that are controlled by an autonomous vehicle control unit. All of the control systems and self-driving subsystems are at least partly embodied in computing device(s) installed on the autonomous vehicle, and which may be partly embodied in remote computing device(s) in communication with the vehicle-installed computing device(s).

In an example embodiment, an autonomous vehicle can include a distributed computing vehicle control unit (DCVCU) 150 also referred to as an in-vehicle control distributed computing system, which can be resident on the autonomous vehicle 100 and in data communication with a plurality of vehicle subsystems 140 resident in the vehicle 100. The DCVCU 150 includes a plurality of individual computing systems 160, shown in FIG. 1 as computing system 160A, 160B, 160C, . . . 160N. Each individual computing system 160A, 160B, 160C through 160N can include one or more computers, comprising at least a processor and a memory. In some implementations, the individual computing systems 160A, 160B, 160C through 160N may include an individual database to organize data for the vehicle subsystems 140 to be distributed across multiple computing systems. Although four individual computing systems 160A, 160B, 160C, 160N are shown as part of the plurality of individual computing systems 160, the plurality of individual computer systems 160 may include two individual computing systems, or three individual computing systems. Alternatively, the plurality of individual computer systems 160 may include more than four individual computer systems.

Implementations of the example DCVCU 150 can include one or more of the following features and advantages. For example, the DCVCU 150 can provide a decentralized computing architecture that creates redundancies in data processing and management, which can mitigate and reduce potential failures data failures or errors that could propagate throughout the computing architecture. Thus, the DCVCU 150 can increase the safety of operation of the autonomous vehicle 100. Moreover, for example, the DCVCU 150 can reduce the data transmission load on individual and the collective computing devices on board the autonomous vehicle 100. For example, the DCVCU 150 can distribute the computing processes to each or some of the individual computing systems 160A, 160B, 160C, . . . 160N such that each individual computing system 160A, 160B, 160C, . . . 160N can process data in parallel and minimize overall computing power, as compared to a single computer (that would require an advanced, powerful CPU and/or GPU).

In some embodiments, each individual computing system 160A, 160B, 160C, . . . 160N can include a vehicle subsystem interface (not shown) to facilitate data communication between the DCVCU 150 and the plurality of vehicle subsystems 140. In some embodiments, the vehicle subsystem interface can include a controller area network (CAN) controller to communicate with devices in the vehicle subsystems 140. Each individual computing system of the plurality of individual computing systems 160 can be configured to include a data processor to execute instructions and data for autonomous vehicle control, including processing data received from one or more of the vehicle subsystems 140. The data processor can be combined with a data storage device, which can be used to store data, processing parameters, and data processing instructions. An example embodiment of an individual computing systems 160 is shown later in FIG. 6.

As illustrated in FIG. 1, the autonomous vehicle 100 may include various vehicle subsystems such as a vehicle drive subsystem 142, a vehicle sensor subsystem 144, and a vehicle control subsystem 146. The autonomous vehicle 100 can optionally include an occupant interface subsystem 148. The autonomous vehicle 100 may include more or fewer subsystems, and each subsystem could include multiple elements. Further, each of the subsystems and elements of the autonomous vehicle 100 can be interconnected. Thus, one or more of the described functions of the autonomous vehicle 100 may be divided up into additional functional or physical components or combined into fewer functional or physical components. In some further examples, additional functional and physical components may be added to the examples illustrated by FIG. 1.

The vehicle drive subsystem 142 may include components operable to provide powered motion for the autonomous vehicle 100. The vehicle drive subsystem 142 may include an engine or motor 142A, wheels/tires 142B, a drivetrain 142C including a transmission, a power system 142E that includes a power source and energy storage, and electrical subsystem 142D, e.g., including the alternator. The engine or motor may be any combination of an internal combustion engine, an electric motor, steam engine, fuel cell engine, propane engine, or other types of engines or motors. The engine may be configured to convert a power source into mechanical energy. The vehicle drive subsystem 142 may include multiple types of engines or motors. For instance, a gas-electric hybrid car could include a gasoline engine and an electric motor. Other examples are possible.

The wheels 142B of the autonomous vehicle 100 may include standard tires. The wheels of the autonomous vehicle 100 may be configured in various formats, including a unicycle, bicycle, tricycle, or a four-wheel format, such as on a car or a truck, for example. Other wheel geometries are possible, such as those including six or more wheels. Any combination of the wheels of autonomous vehicle 100 may be operable to rotate differentially with respect to other wheels. The wheels may represent at least one wheel that is fixedly attached to the transmission and at least one tire coupled to a rim of the wheel that could make contact with the driving surface. The wheels may include a combination of metal and rubber, or another combination of materials. The drivetrain 142C may include elements that are operable to transmit mechanical power from the engine to the wheels. For this purpose, the drivetrain could include a transmission, a gearbox, a clutch, a differential, and drive shafts. The drivetrain may include other elements as well. The drivetrain may include one or more axles that could be coupled to one or more wheels.

The power system 142E may represent a source of energy that may, in full or in part, power the engine or motor and store energy for the vehicle. The power system also provides energy for other subsystems of the autonomous vehicle 100, typically via an electrical power source. In the embodiment shown in FIG. 1, an electrical power source includes a battery. Other examples of power sources that can power the engine or motor 142A can include gasoline, diesel, other petroleum-based fuels, propane, other compressed gas-based fuels, ethanol, fuel cell, solar panels, batteries, and other sources of electrical power. The power source could additionally or alternatively include any combination of fuel tanks, batteries, capacitors, or flywheels. The electrical system 142D may include elements that are operable to transfer and control electrical signals in the autonomous vehicle 100. These electrical signals can be used to activate lights, servos, electrical motors, and other electrically driven or controlled devices of the autonomous vehicle 100.

The vehicle sensor subsystem 144 may include a number of sensors configured to sense information or perception data related to an environment or condition of the autonomous vehicle 100. For example, the vehicle sensor subsystem 144 may include an inertial measurement unit (IMU) or inertial sensors 144A, a Global Positioning System (GPS) transceiver 144B, a RADAR and/or laser range finder/LIDAR unit 144C, vehicle control monitoring sensors (e.g., braking sensor) 144D and one or more cameras or image capture devices 144E. The vehicle sensor subsystem 144 may also include sensors configured to monitor internal systems of the autonomous vehicle 100 (e.g., an O2 monitor, a fuel gauge, an engine oil temperature). Other sensors are possible as well. One or more of the sensors included in the vehicle sensor subsystem 144 may be configured to be actuated separately or collectively in order to modify a position, an orientation, or both, of the one or more sensors.

The IMU 144A may include any combination of sensors (e.g., accelerometers and gyroscopes) configured to sense changes in position and orientation of the autonomous vehicle 100 based on inertial acceleration. The GPS transceiver 144B may be any sensor configured to estimate a geographic location of the autonomous vehicle 100. For this purpose, the GPS transceiver 144B may include a receiver/transmitter operable to provide information regarding the position of the autonomous vehicle 100 with respect to the Earth. The RADAR unit 144C may represent a system that utilizes radio signals to sense objects within the local environment of the autonomous vehicle 100. In some embodiments, in addition to sensing the objects, the RADAR unit 144C may additionally be configured to sense the speed and the heading of the objects proximate to the autonomous vehicle 100. The laser range finder or LIDAR unit 144C may be any sensor configured to sense objects in the environment in which the autonomous vehicle 100 is located using lasers. In an example embodiment, the laser range finder/LIDAR unit 144C may include one or more laser sources, a laser scanner, and one or more detectors, among other system components. The laser range finder/LIDAR unit 144C could be configured to operate in a coherent (e.g., using heterodyne detection) or an incoherent detection mode. The cameras 144E may include one or more devices configured to capture a plurality of images of the environment of the autonomous vehicle 100. The cameras 144E may be still image cameras or motion video cameras.

The vehicle control subsystem 146 may be configured to control operation of the autonomous vehicle 100 and its components. Accordingly, the vehicle control subsystem 146 may include various elements such as an engine control unit (e.g., throttle) 146A, a braking unit 146B, a navigation unit 146C, a steering unit 146D, and a main autonomous control unit 146E. The steering unit 146D may represent any combination of mechanisms that may be operable to adjust the heading of autonomous vehicle 100. The engine control unit 146A, or throttle, may be configured to control, the operating speed of the engine and, in turn, control the speed of the autonomous vehicle 100. In an internal combustion engine, the engine control unit 146A may control the flow of fuel and/or oxygen, ignition timing, compression ratios and the like. The braking unit 146B may utilize any combination of mechanisms configured to decelerate the autonomous vehicle 100 including engine braking. The brake unit 146B can use friction to slow the wheels in a standard manner. In other embodiments, the brake unit 146B may convert the kinetic energy of the wheels to electric current. The brake unit 146B may take other forms as well. The navigation unit 146C may be any system configured to determine a driving path or route for the autonomous vehicle 100. The navigation unit 146C may additionally be configured to update the driving path dynamically while the autonomous vehicle 100 is in operation. In some embodiments, the navigation unit 146C may be configured to incorporate data from a GPS transceiver and/or one or more predetermined maps so as to determine the driving path for the autonomous vehicle 100.

The vehicle control subsystem 146 can include an autonomous drive control unit configured to identify, evaluate, and avoid or otherwise negotiate potential obstacles in the environment of the autonomous vehicle 100. In general, the autonomous drive control unit may be configured to control the autonomous vehicle 100 for operation without a driver or to provide driver assistance in controlling the autonomous vehicle 100. In some embodiments, the autonomous drive control unit may be configured to incorporate data from the GPS transceiver, the RADAR, the LIDAR, the cameras, and/or other vehicle subsystems to determine a driving path or trajectory for the autonomous vehicle 100. The vehicle control subsystem 146 may additionally or alternatively include components other than those shown and described.

The optional occupant interface subsystems 148 may be configured to allow interaction between the autonomous vehicle 100 and any of the following: external sensors, other vehicles, other computer systems, and an occupant or user of autonomous vehicle 100. For example, the occupant interface subsystems 148 may include standard visual display devices (e.g., plasma displays, liquid crystal displays (LCDs), touchscreen displays, heads-up displays, or the like), speakers or other audio output devices, microphones or other audio input devices, navigation interfaces, and interfaces for controlling the internal environment (e.g., temperature, fan, etc.) of the autonomous vehicle 100.

In some embodiments of the DCVCU 150, at least one of the individual computing systems 160 can include a web-enabled device interface (not shown) that facilitates data communications between the DCVCU 150 and an external network via a web-enabled device of the autonomous vehicle 100 (not shown), such as an external network of computers in communication with each other over the Internet, including the "cloud." In some implementations, the DCVCU 150 can include a computing device that provides data security in the communication network between the plurality of individual computing systems 160 and cloud computers, e.g., to monitor and mitigate hacking or other potentially nefarious activity. Similarly, in some embodiments of the DCVCU 150, at least one of the individual computing systems 160A, 160B, 160C . . . 160N can include a user mobile device interface (not shown) that facilitates data communication between the DCVCU 150 and the external network via a user mobile device (not shown). In this manner, the DCVCU 150 can obtain real-time access to network resources via network, which can be used to obtain processing modules for execution by data processor, data content to train internal neural networks, system parameters, or other data.

An example distributed computing system for controlling operations of an autonomous vehicle may include a first computing system and a second computing system. The first computing system includes a first processor and a first memory. The first computing system can be configured to process data associated with (i) at least some subsystems in a set of main subsystems of the autonomous vehicle that include a steering subsystem, a throttle subsystem, and a braking subsystem, and (ii) at least some modules in a set of autonomous control modules that control autonomous driving functionalities of the autonomous vehicle. The set of autonomous control modules may include a steering control module, a throttle control module and a braking control module. The second computing system comprises a second processor and a second memory. The second computing system may be configured to process data associated with (i) at least some subsystems among the set of main subsystems of the autonomous vehicle, and (ii) at least some subsystems among the set of autonomous control modules. The first computing system and the second computing system are configured in an intra-vehicle network to share data processing among the set of main subsystems and the set of autonomous control modules in order to synchronously operate the autonomous vehicle.

One or both of the first computing system and the second computing system are in data communication with an external network of computing devices in the cloud, in some embodiments. A security computing device may be in data communications between the external network of computing devices in the cloud and the first and second computing systems, and that security computing device may be configured to provide data security services including data monitoring and mitigation of a potentially nefarious data activity. The system may include a third computing system with a third processor and a third memory. This third computing system may be configured to process data associated with (i) at least some subsystems among the set of main subsystems of the autonomous vehicle, and (ii) at least some subsystems among the set of autonomous control modules.

II. Autonomous Driving Operations Using Distributed Computing System

Figure 2:
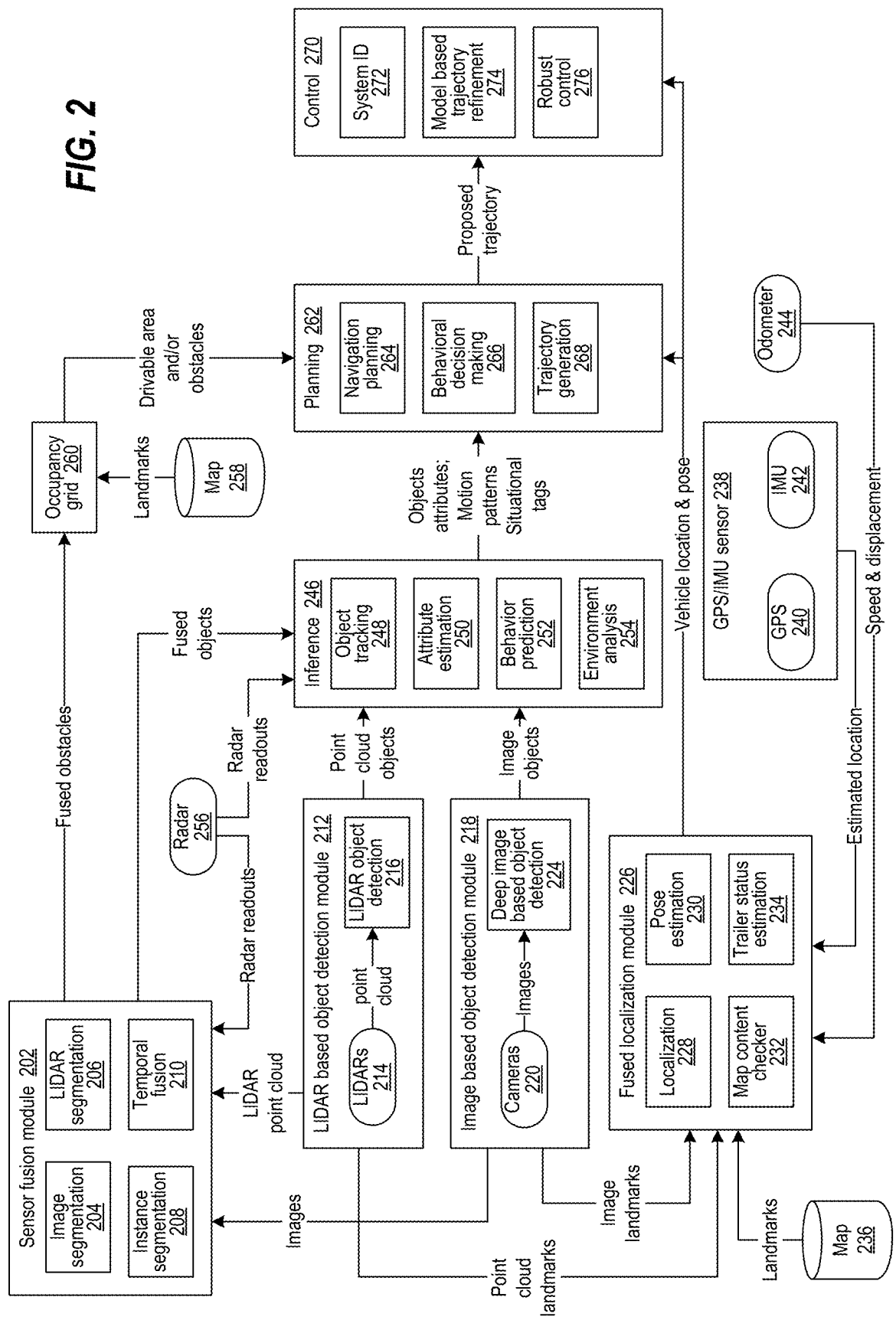
FIG. 2 shows an exemplary system for providing precise autonomous driving operations using distributed computing technology.

FIG. 2 shows an exemplary system for providing precise autonomous driving operations using distributed computing technology. The system includes several modules that can operate in a distributed computing environment by operating in multiple computers in the plurality of individual computing systems 160 as described in FIG. 1. For example, the modules or operations shown in FIG. 2 can be performed by two or more computers, where each computer is associated with a different computing system. In an example implementation, one or more computers in a first computing system may execute, or perform, the following modules or operations: a sensor fusion module 202, LIDAR based object detection 212, an image-based object detection module 218, a fused localization module 226, a mapping module 236, a GPS/IMU sensor module 238, a RADAR module 256, another map module 258, and an occupancy grid 260. A second computing system that includes one or more additional computers may perform the following modules or operations: inference 246, planning 262, and control 270, shown in FIG. 2.

At least one computer in an individual computing system may include a sensor fusion module 202 shown in the top left corner of FIG. 2 (e.g., shown as 760 in FIG. 7), where the sensor fusion module 202 may perform at least four image or signal processing operations. The sensor fusion module 202 can obtain images from cameras located on an autonomous vehicle to perform image segmentation 204 to detect the presence of moving objects (e.g., other vehicles, pedestrians, etc.) and/or static obstacles (e.g., stop sign, speed bump, terrain, etc.) located around the autonomous vehicle. The sensor fusion module 202 can obtain LIDAR point cloud data from LIDAR systems located on the autonomous vehicle to perform LIDAR segmentation 206 to detect the presence of objects and/or obstacles located around the autonomous vehicle.

The sensor fusion module 202 can perform instance segmentation 208 on image and/or point cloud data to identify an outline (e.g., boxes) around the objects and/or obstacles located around the autonomous vehicle. The sensor fusion module 202 can perform temporal fusion 210 where objects and any obstacles from one image of point cloud data are correlated with or associated with objects and obstacles from one or more images subsequently received in time. Alternatively, or additionally, the sensor fusion module 202 can perform temporal fusion 210 on a frame by frame basis on point cloud data.

The sensor fusion module 202 can fuse the objects, obstacles, or both objects and obstacles from camera and LIDAR data, including images and point cloud data. The fused data may be only image data or only point cloud data. The data that is fused by the sensor fusion module may be both image data and point cloud data. For example, the sensor fusion module 202 may determine based on a location of two cameras that an image from one of the cameras comprising one half of a vehicle located in front of the autonomous vehicle is the same as the vehicle located captured by another camera. The sensor fusion module 202 sends the fused object information to the inference module 246 (e.g., shown as 745 in FIG. 7) and the fused obstacle information to the occupancy grid module 260 (e.g., shown as 740 in FIG. 7). At least one computer in an individual computing system may include the occupancy grid module 260 can retrieve landmarks from a map database 258 (e.g., shown as 725 in FIG. 7) that may be stored in the at least one computer in the individual computing system. The occupancy grid module 260 can determine drivable area and/or obstacles from the fused obstacles obtained from the sensor fusion module 202 and the landmarks stored in the map database 258. For example, the occupancy grid module 260 can determine that a drivable area may include a speed bump obstacle.

Below the sensor fusion module 202 in FIG. 2 is at least one computer in an individual computing system that include a LIDAR based object detection module 212 (e.g., shown as 735 in FIG. 7) that can perform object detection 216 based on point cloud data obtained from the LIDAR systems 214 located on the autonomous vehicle. The object detection 216 technique can provide a location (e.g., in 3D world coordinates) of objects from the point cloud data. Below the LIDAR based object detection module 212 in FIG. 2 is at least one computer in an individual computing system that may include an image based object detection module 218 (e.g., shown as 730 in FIG. 7) that can perform object detection 224 based on images obtained from cameras 220 located on the autonomous vehicle. The object detection 224 technique can employ a deep machine learning technique to provide a location (e.g., in 3D world coordinates) of objects from the image provided by the camera.

The RADAR on the autonomous vehicle can scan an area in front of the autonomous vehicle or an area towards which the autonomous vehicle is driven. The data from the RADAR (also known as Radar data) is sent to the sensor fusion module 202. The sensor fusion module 202 can use the Radar data to correlate the objects and/or obstacles detected by the RADAR with the objects and/or obstacles detected from both the LIDAR point cloud data and the camera image. The Radar data is also sent to the inference module 246. The inference module 246 can perform data processing on the Radar data to track objects 248 as further described below.

At least one computer in an individual computing system may include an inference module 246 that receives the locations of the objects from the point cloud and the objects from the image, and the fused objects from the sensor fusion module 202. The inference module 246 also receive the Radar data with which the inference module 246 can track objects 248 from one point cloud data and one image obtained at one time instance to another (or the next) point cloud data and another image obtained at another subsequent time instance.

The inference module 246 may perform object attribute estimation 250 to estimate one or more attributes of an object detected in an image or point cloud data. The one or more attributes of the object may include a type of object (e.g., pedestrian, car, or truck, etc.). The inference module 246 may perform or execute a behavior prediction module or process to estimate or predict motion pattern of an object detected in an image and/or a point cloud. The behavior prediction 252 process or module can be performed to detect a location of an object in a set of images received at different points in time (e.g., sequential images) or in a set of point cloud data received at different points in time (e.g., sequential point cloud data). In some embodiments the behavior prediction 252 can be performed for each image received from a camera and/or each point cloud data received from the LIDAR sensor. In some embodiments, the inference module 246 can be performed to reduce computational load by performing behavior prediction 252 on every other or after every pre-determined number of images received from a camera or point cloud data received from the LIDAR sensor (e.g., after every two images or after every three point cloud data).

The behavior prediction 252 feature may determine the speed and direction of the objects that surround the autonomous vehicle from the Radar data, where the speed and direction information can be used to predict or determine motion patterns of objects. A motion pattern may include a predicted trajectory information of an object over a pre-determined length of time in the future after an image is received from a camera. Based on the motion pattern predicted, the inference module 246 may assign motion pattern situational tags to the objects (e.g., "located at coordinates (x,y)," "stopped," "driving at 50 mph," "speeding up" or "slowing down"). The situation tags can describe the motion pattern of the object. The inference module 246 sends the one or more object attributes (e.g., types of the objects) and motion pattern situational tags to the planning module 262 (e.g., shown as 750 in FIG. 7). In some embodiments, the inference module 246 may perform an environment analysis 254 in which the inference module 246 may determine a condition of the environment in which the autonomous vehicle is operating. For example, based on the camera and/or LIDAR data, the inference module 246 may determine that the autonomous vehicle is driving in heavy traffic if the number of objects or vehicles in front of the autonomous vehicle is greater than a pre-determined value.

At least one computer in an individual computing system (e.g., any of 160A, 160B, 160C, . . . 160N in FIG. 1) may include the planning module 262 that receives the object attributes and motion pattern situational tags from the inference module 246, the drivable area and/or obstacles, and the vehicle location and pose information from the fused localization module 226 (further described below and, e.g., shown as 765 in FIG. 7). The pose information may provide an orientation related information of objects/vehicles.

The planning module 262 can perform navigation planning 264 to determine a set of trajectories on which the autonomous vehicle can be driven. The set of trajectories can be determined based on the drivable area information, the one or more object attributes of objects, the motion pattern situational tags of the objects, location of the obstacles, and the drivable area information. In some embodiments, the navigation planning 264 may include determining an area next to the road where the autonomous vehicle can be safely parked in case of emergencies. The planning module 262 may include behavioral decision making 266 to determine driving actions (e.g., steering, braking, throttle) in response to determining changing conditions on the road (e.g., traffic light turned yellow, or the autonomous vehicle is in an unsafe driving condition because another vehicle drove in front of the autonomous vehicle and in a region within a pre-determined safe distance of the location of the autonomous vehicle). The planning module 262 performs trajectory generation 268 and selects a trajectory from the set of trajectories determined by the navigation planning operation 264. The selected trajectory information is sent by the planning module 262 to the control module 270 (e.g., shown as 755 in FIG. 7).

At least one computer in an individual computing system may include a control module 270 that receives the proposed trajectory from the planning module 262 and the autonomous vehicle location and pose (e.g., orientation) from the fused localization module 226. The control module 270 includes a system identifier 272. The control module 270 can perform a model based trajectory refinement 274 to refine the proposed trajectory. For example, the control module 270 can applying a filtering (e.g., Kalman filter) to make the proposed trajectory data smooth and/or to minimize noise from the proposed trajectory. The control module 270 may perform the robust control 276 by determining, based on the refined proposed trajectory information and current location and/or pose of the autonomous vehicle, an amount of brake pressure to apply, a steering angle, a throttle amount to control the speed of the vehicle, and/or a transmission gear. The pose of the autonomous vehicle can indicate an orientation of the autonomous vehicle. The control module 270 can send the determined brake pressure, steering angle, throttle amount, and/or transmission gear to one or more devices in the autonomous vehicle to control and facilitate precise driving operations of the autonomous vehicle.

The deep image-based object detection 224 performed by the image based object detection module 218 can also be used detect landmarks (e.g., stop signs, speed bumps, etc.) on the road. At least one computer in an individual computing system may include a fused localization module 226 that obtains landmarks detected from images, the landmarks obtained from a map database 236 that may be stored on the at least one computer in the individual computing system, the landmarks detected from the point cloud data by the LiDAR based object detection module 212, the speed and displacement from the odometer sensor 244 and the estimated location of the autonomous vehicle from the GPS/IMU sensor(s) 238, 240, 242 located on or in the autonomous vehicle. Based on this information, the fused localization module 226 can perform a localization operation 228 to determine a location of the autonomous vehicle, which can be sent to the planning module 262 and the control module 270.

The fused localization module 226 can estimate pose 230 of the autonomous vehicle based on the GPS and/or IMU sensors. The pose or orientation of the autonomous vehicle can be sent to the planning module 262 and the control module 270. The fused localization module 226 can also estimate status (e.g., location, possible angle of movement) of the trailer unit 234 based on, for example, the information provided by the IMU sensor (e.g., angular rate and/or linear velocity). The fused localization module 226 may also check the map content 232.

Figure 3:
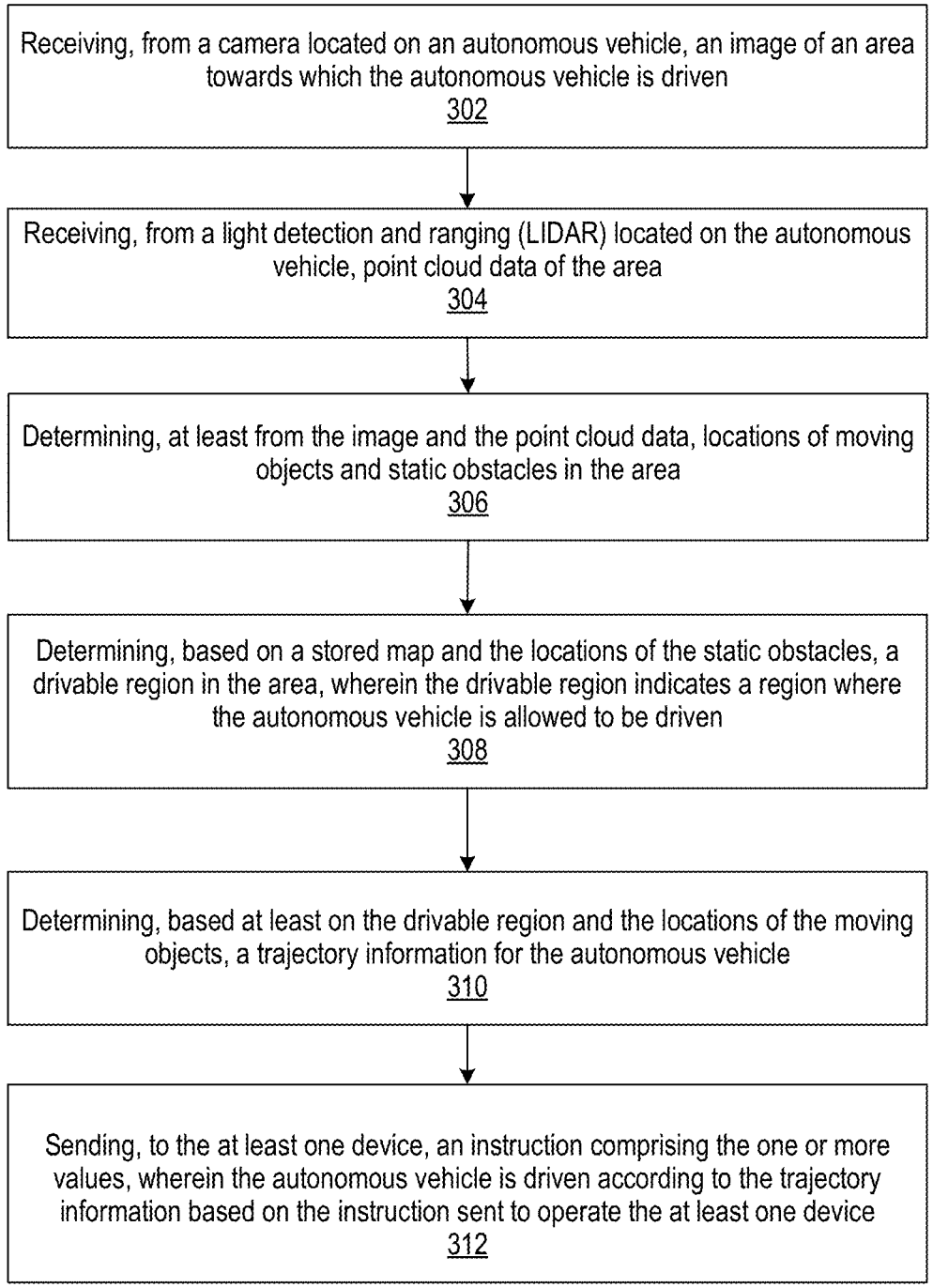
FIG. 3 shows an exemplary flow diagram for precise autonomous driving operations of an autonomous vehicle.

FIG. 3 shows an exemplary flow diagram for precise autonomous driving operations of an autonomous vehicle using distributed computing technology. The operations shown in FIG. 3 may be performed by at least computer in each of a plurality of individual computing systems 160 as shown in FIG. 1. The receiving operation 302 includes receiving, from a camera located on an autonomous vehicle, an image of an area towards which the autonomous vehicle is driven. The receiving operation 304 includes receiving, from a LIDAR located on the autonomous vehicle, point cloud data of the area.

The determining operation 306 includes determining, at least from the image and the point cloud data, locations of moving objects and static obstacles in the area. The determining operation 308 includes determining, based on a stored map and the locations of the static obstacles, a drivable region in the area, where the drivable region indicates a region where the autonomous vehicle is allowed to be driven.

The determining operation 310 includes determining, based at least on the drivable region and the locations of the moving objects, a trajectory information for the autonomous vehicle. The sending operation 312 includes sending, to at least one device located in the autonomous vehicle, an instruction comprising one or more values that are determined based at least on the trajectory information, and where the autonomous vehicle is driven according to the trajectory information based on the instruction sent to operate the at least one device.

At least one computer in an individual computing system may be configured to determine one or more values for operating at least one device located in the autonomous vehicle based on the trajectory information and based on a location and an orientation of the autonomous vehicle. At least one computer in an individual computing system may determine that an object or obstacle acquired by multiple sensors may be the same by receiving a second image of at least part of the area. The second image may be received by a second camera located on the autonomous vehicle. Determining that a first set of one or more moving objects (e.g., vehicles) or one or more static obstacles (e.g., signs) from the image is the same a second set of one or more moving objects or one or more static obstacles from the second image may be part of determining by an individual computing system one or more values for operating at least one device, as may be combining the first set and the second set, where the moving objects and static obstacles comprise a combination of the first set and the second set.

At least one computer in an individual computing system may be further configured to track a location of at least one moving object based on detecting the at least one moving object in the received image and one or more additional images received from the camera, where the one or more additional images are received in time after the image is received in some embodiments. A tracking operation may be performed by storing a set of locations of the at least one moving object over a pre-determined time period.

In some embodiments, at least one computer in an individual computing system may be further configured to determine motion patterns of the moving objects over a pre-determined length of time after the image is received from the camera, where the motion patterns indicates predicted trajectories of the moving objects based on (1) detecting the moving objects in the received image, and (2) determining speeds and directions of movement of the moving objects. At least one computer in an individual computing system may be further configured to assign, to the moving objects, situational tags that describe the motion patterns of the moving objects. For example, at least one situation tag for at least one moving object may include a speed of the at least one moving object and/or an indication of whether the at least one moving object is speeding up or slowing down.

The trajectory for the autonomous vehicle may be determined based on the drivable region, the locations of the moving objects, one or more attributes of the moving objects, the situational tags for the moving objects, and the locations of the static obstacles. The trajectory information may be filtered by applying a filter to the trajectory information. The filter may include a Kalman filter configured to minimize noise in the trajectory information. The one or more values may be determined for at least one device by: determining a steering angle of a steering of the autonomous vehicle, a throttle amount for an engine of the autonomous vehicle, a transmission gear for a transmission of the autonomous vehicle, and/or a braking amount of brakes of the autonomous vehicle.

A first set of operations that are performed by a first computer in the DCVCU may include operations 302 to 308, shown in FIG. 3. Operations 310 to 310 may be included in a second set of operations that are performed by a second computer in the DCVCU. A first processor of the first computer and a second processor of the second computer may be configured to perform respective operations based on an autonomous driving software model that assigns the first set of operations to the first computer and the second set of operations to the second computer.

A motion pattern of at least one moving object may be determined by at least one computer in an individual computing system after the image is received from the camera, where the motion pattern indicates a predicted trajectory of the at least one moving object based at least on a determination of speeds and directions of movement of the moving objects. An individual computing system may include at least one computer that determines an area next to the road to safely park the autonomous vehicle in case of an emergency.

Figure 4:
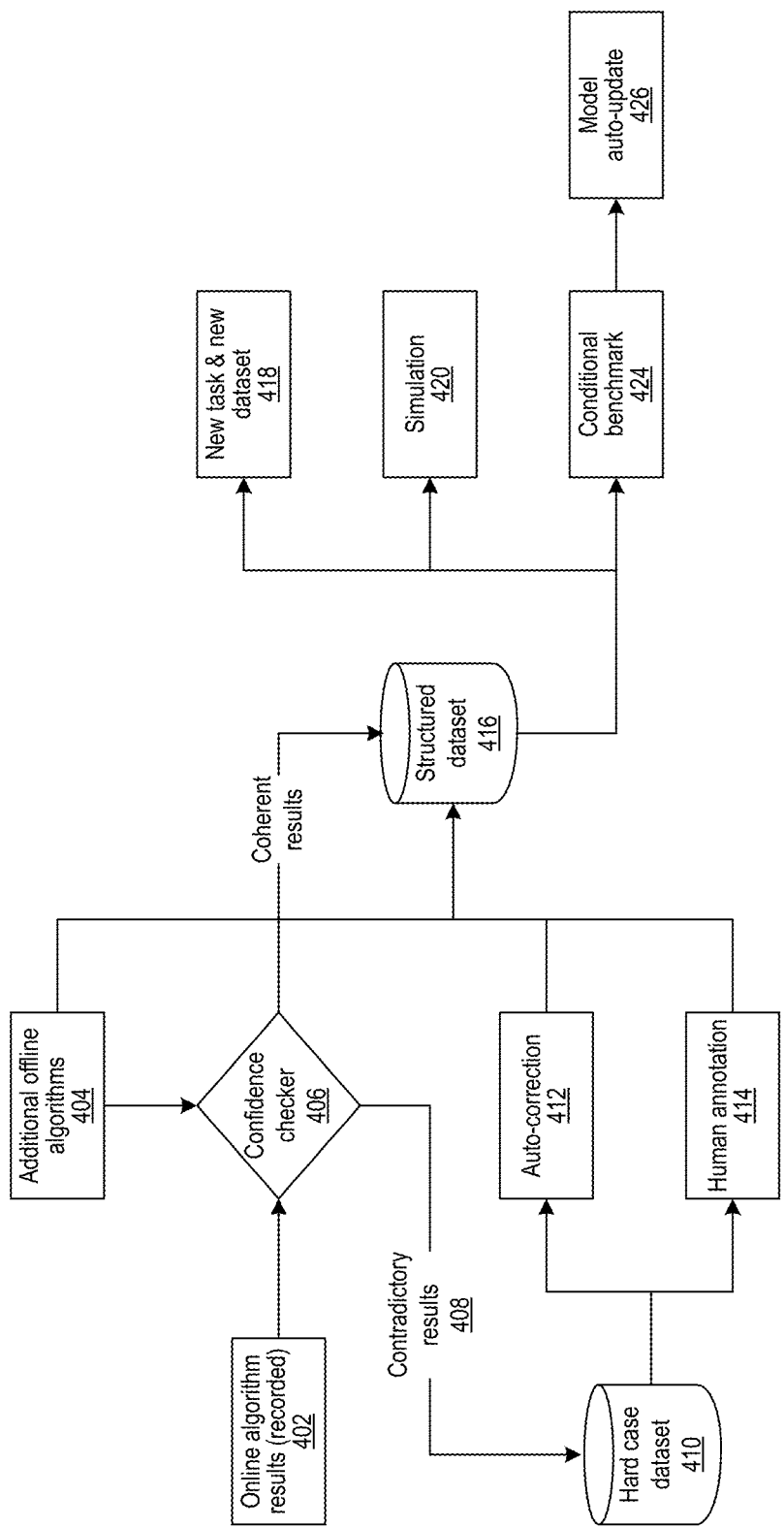
FIG. 4 shows an exemplary flowchart for improving software-based control of autonomous vehicles.

III. Obtain Autonomous Driving Software that Operates Using Distributed Computing System FIG. 4 shows an exemplary flowchart for updating a software-based control of autonomous vehicles. The software updating process takes in recorded online algorithm results 402 and additional offline algorithms 404 obtained from previous operation of the autonomous vehicle. The autonomous driving software obtained from operation 426 can be designed to operate in a distributed computing system as described in FIG. 1.

In the updating process, a confidence checker module (e.g., shown as 825 in FIG. 8) may perform a confidence checking operation 406 using recorded online algorithm results 402 and offline algorithm results 404 obtained from previous operation of the autonomous vehicle. At operation 402, a confidence checker module of a computer obtains a result of online algorithms that may be performed by at least one computer in a plurality of individual computing systems 160 as shown in FIG. 1 to perform autonomous driving related operations. Online algorithm results 402 may include a first set of data that describes autonomous driving operations in response to a known scenario. For example, the first set of data related to autonomous driving operations may include at least one computer in an individual computing system determining that a steering wheel motor needs to be turned 15 degrees clockwise to steer the autonomous vehicle when the autonomous vehicle reaches a known intersection. The first set of data related to autonomous driving operations may also provide status information of the various aspects of the autonomous vehicle, (e.g., speed, brake amount, transmission gear) when the autonomous vehicle is being driven through the known scenario.

In some embodiments, the online algorithm results may include health status information of the various devices and autonomous driving software operating in at least one computer in an individual computing system. The health status information may include one or more error codes generated by one or more devices and/or autonomous driving software when the autonomous vehicle was being driven. The online algorithm results may include additional explanation of the reason why the error code was generated and the time when the error code was generated.

At operation 404, the confidence checker module of the computer receives additional offline algorithms and can process the known scenario with the additional offline algorithm. In some embodiments, the additional offline algorithm may be software code that a developer or engineer has built to debug existing version of the autonomous driving software operating in at least one computer in an individual computing system. The result of the processing the known scenario with the additional offline algorithm can provide a second set of data that describes simulated autonomous driving operations in response to the known scenario. The second set of data may also include status information of the various aspects of the autonomous vehicle as the autonomous vehicle is simulated through the known scenario. The offline algorithms may have been corrected through intervention by a human operator, as is described in the present document.

The confidence checker module at operation 406 can compare the first set of data with the second set of data to evaluate how the two versions of the autonomous driving software operate with the same scenario. In some embodiments, the confidence checker module can use techniques such as null hypothesis statistical testing to compare the two sets of data. The confidence checker module can determine one or more metrics that quantify the difference between the two sets of data. If the confidence checker module determines that one or more determined metrics is greater than one or more known thresholds, then the confidence checker module 406 can determine that the difference between the two sets is significant and both sets of data are sent as contradictory results 408 to a hard case dataset 410 database in the computer (e.g., shown as 830 in FIG. 8).

The auto-correction module 412 (e.g., shown as 835 in FIG. 8) can perform auto-correction operation by determining changes to the existing autonomous driving software to improve the existing autonomous driving software. In some embodiments, the changes may include determining the updates to formula(s) (or equation(s)) and/or machine learning model(s) in the existing autonomous driving software that may need to be changed to have the existing autonomous driving software yield the second set of data to the known scenario. In some embodiments, changes may include updates to the machine learning model used by the existing autonomous driving software or updates to image processing techniques to better identify moving objects (e.g., other cars, pedestrians) or static obstacles (e.g., speed bumps, stop signs, etc.) located in an area surrounding the autonomous vehicle. In some embodiments, the changes may include updating the various modules of the autonomous driving software (e.g., as shown in FIG. 2) to perform their operations in a distributed computing system such as the DCVCU in FIG. 1.

The human annotation module (e.g., shown as 840 in FIG. 8) can perform the human annotation operation 414 by sending to a computer monitor the first set of data, the second set of data, the existing autonomous driving software and the additional offline algorithm so that a developer or an engineer can debug or revise the existing autonomous driving software. The formula(s) and/or machine learning model(s) of the revised autonomous driving software obtained from either operation 412 or 414 can be sent to the structure dataset database 416 included in the computer (e.g., shown as 845 in FIG. 8). In some embodiments, the human annotation module may send to a computer monitor an image for which a semantic segmentation process yielded one or more regions, where at least one computer in an individual computing system could not determine the identity of the one or more regions. In such embodiments, a person can assign identities for the one or more regions that at least one computer in an individual computing system could not identify.

Returning to operation 406, if the results of the first and second sets of data are determined to be coherent by the confidence checker module, then the coherent results output are sent to the structured dataset 416. The confidence checker module 406 may determine that the first set of data and second set of data are coherent if one or more metrics that describes the difference between the two sets of data are less than one or more known thresholds. The coherent results output from the confidence checker may include value(s), variable(s), formula(s), and/or machine learning model(s) of the existing autonomous driving software.

The value(s), variable(s), and/or formula(s) included in the structured dataset 416 may be used to analyze new tasks and a dataset 418 or to perform simulation 420 or to set conditional benchmarks 424. A data processing module of the computer (e.g., shown as 850 in FIG. 8) may perform the creation of a new task and new data set 418, perform a simulation 420, or to set a conditional benchmark 424. As an example, the data processing module can perform simulation 420 using images or point cloud data of the known scenario based on the value(s), variable(s), and/or formula(s) stored in the structured dataset 416. In embodiments where the structured dataset 416 includes new value(s), variable(s), and/or formula(s) for a revised or debugged autonomous driving software version, the simulation 420 can be performed on the new value(s), variable(s), and/or formula(s) to assess performance of the revised or debugged autonomous driving software version. For example, the simulations may be used to perform software regression testing.

The data processing module can perform conditional benchmarks 424 using the value(s), variable(s), and/or formula(s) stored in the structured dataset 416 for the first set of data (for the existing autonomous driving software) or for the second set of data (for the revised autonomous driving software). The conditional benchmark may be performed by simulating operations of a version of autonomous driving software with camera images and/or LIDAR point cloud data that are previously recorded and stored in some embodiments. The conditional benchmark operation can calculate one or more metrics that characterizes the overall performance of the autonomous driving software. The data processing module can automatically update a model 426 if the data processing module determines that one or more metrics of the conditional benchmark operation 424 exceed pre-determined threshold(s). A model may include, for example, a revised autonomous driving software or a machine learning model.

The updated or revised autonomous driving software may include code or instruction that are used to perform operations described in FIGS. 2 and 3. In some embodiments, the updated or revised autonomous driving software can be configured to operate in the DCVCU by assigning to different computers in the DCVCU different set of operations associated with the modules/operations shown in FIGS. 2 and 3. For example, operations 302 to 308 in FIG. 3 may be performed by a first computer in the DCVCU in the autonomous vehicle and operations 310 to 312 in FIG. 3 may be performed by a second computer in the DCVCU in the autonomous vehicle.

Figure 5:
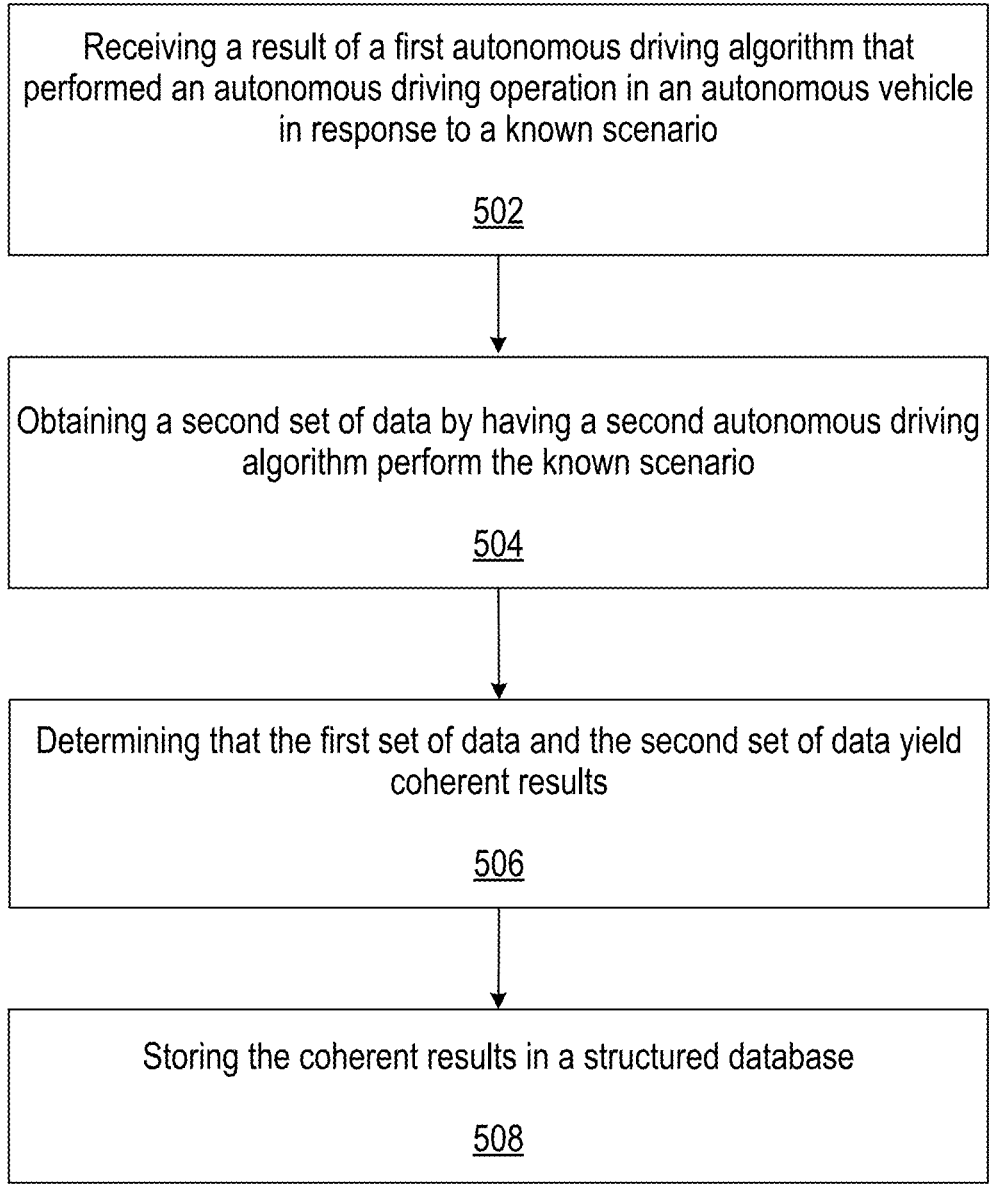
FIG. 5 shows an exemplary flowchart for improving software that operates in an autonomous vehicle using distributed computing technology.

FIG. 5 shows an exemplary flowchart for improving software that operates in an autonomous vehicle using distributed computing technology. The operations shown in FIG. 5 may be performed by at least computer in each of a plurality of individual computing systems 160 as shown in FIG. 1. At the receiving operation 502, a confidence checker module receives a result of a first autonomous driving algorithm that performed an autonomous driving operation in an autonomous vehicle in response to a known scenario. The result includes a first set of data determined for performing the autonomous driving operation. At the obtaining operation 504, the confidence checker module obtains a second set of data by having a second autonomous driving algorithm perform the known scenario. At the determining operation 506, the confidence checker module determines that the first set of data and the second set of data yield coherent results. The coherent results may include any of one or more values, one or more variables, one or more formulas, and one or more machine learning models of the first autonomous driving algorithm. At the storing operation 508, the structured dataset database stores the coherent results in a structured database.

In some embodiments, the first set of data and the second set of data are determined to yield coherent results by determining that one or more metrics that quantify a difference between the first set of data and the second set of data are less than one or more threshold values.

The method of FIG. 5 may further include performing a new task, a new dataset, a simulation, or a benchmark with the coherent result stored in the structured database. In some embodiments, the method of FIG. 5 further includes sending the first set of data and the second set of data to a second database upon determining that the first set of data and the second set of data yield contradictory results. The method may also include performing either auto-correction of the first autonomous driving algorithm or sending the first set of data to be displayed on a computer for manual correction. Receiving updates to the first autonomous driving algorithm may also be part of the method. Sending the updates to the first autonomous driving algorithm to the database may also be part of the method.

Figure 6:
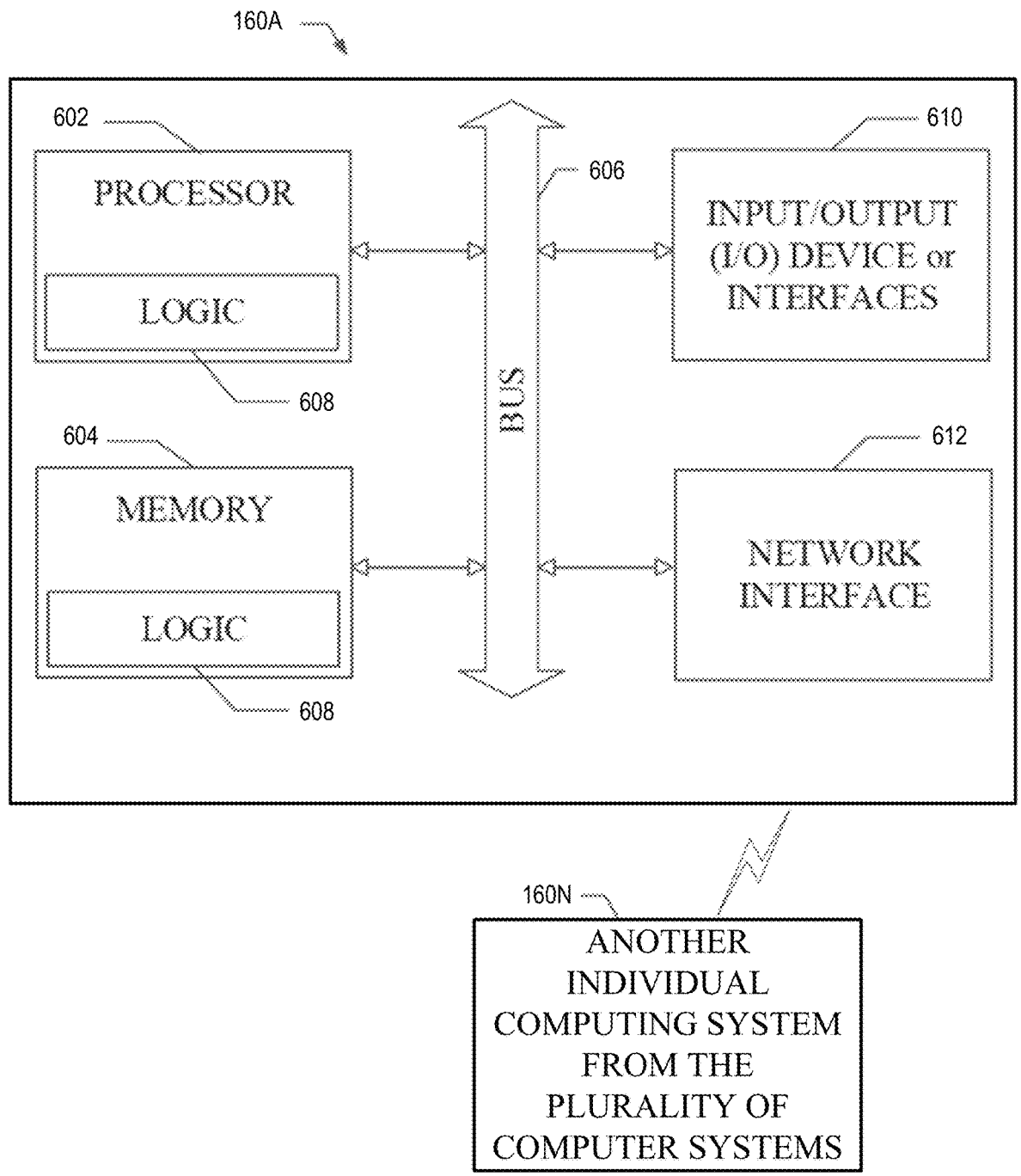
FIG. 6 shows a diagram of an example embodiment of a computing system in accordance with the present technology.

Updates to the first autonomous driving algorithm may include determining updates to the one or more formulas and/or the one or more machine learning models of the first autonomous driving algorithm. In some embodiments, the method of FIG. 5 may include performing a new task, a new dataset, a simulation, or a benchmark with the updates to the first autonomous driving algorithm stored in the structured database. In some embodiments, the determined first set of data includes a steering angle to a steering of the autonomous vehicle, a throttle amount for an engine of the autonomous vehicle, a transmission gear for a transmission of the autonomous vehicle, and/or a braking amount of brakes of the autonomous vehicle FIG. 6 shows a diagram of an example embodiment of an individual computing system 160A of the distributed computing systems 160 shown in FIG. 1 in accordance with the present technology. The individual computing system 160A includes one or more computing machines, within which a set of instructions when executed and/or processing logic when activated may cause the respective machine to perform any one or more of the methodologies described. In some implementations, the one or more computing machines of the individual computing system 160A can operate as a standalone device in addition to being connected (e.g., networked) to other machines within the distributed computing system 160 and/or among the computing machines within the individual computing system 160A.

For example, in a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example embodiment of the individual computing system 160A includes a data processor 602 (e.g., a System-on-a-Chip (SoC), general processing core, graphics core, and optionally other processing logic) and a memory 604, which can communicate with each other via a bus or other data transfer system 606. The individual computing system 160A includes a network interface 612, e.g., which allows the individual machine or machines of the individual computing system 160A to communicate with other individual computing systems (shown as another individual computing system 160N in FIG. 6) in the distributed computing system (160 in FIG. 1) and particular modules and subsystems among the vehicle subsystems (140 in FIG. 1), e.g., such as the vehicle drive subsystem (142 in FIG. 1), the vehicle sensor subsystem (144 in FIG. 1), and/or the vehicle control subsystem (146 in FIG. 1), etc. The individual computing system 160A may optionally include various input/output (I/O) devices and/or interfaces 610, such as a touchscreen display, an audio jack, a voice interface (e.g., for allowing a user to directly access an individual machine within the individual computing system 160A).

In an example embodiment of the network interface 612, the network interface 612 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, 5G, CDMA2000, WLAN, Wireless Router (WR) mesh, and the like). Network interface 612 may also be configured for use with various other wired and/or wireless communication protocols, including TCP/IP, UDP, SIP, SMS, RTP, WAP, CDMA, TDMA, UMTS, UWB, WiFi, WiMax, Bluetooth™, IEEE 802.11x, and the like. In essence, the network interface 612 may include or support virtually any wired and/or wireless communication and data processing mechanisms by which information/data may travel between the individual computing system 160A and another computing or communication system via network.

The memory 604 can represent a machine-readable medium on which is stored one or more sets of instructions, software, firmware, or other processing logic (e.g., logic 608) embodying any one or more of the methodologies or functions described herein. The logic 608, or a portion thereof, may also reside, completely or at least partially within the processor 602 during execution thereof by the individual computing system 160A. As such, the memory 604 and the processor 602 may also constitute machine-readable media. The one or more set of instructions, software, firmware upon execution by the processor 602 configures the processor 602 to perform operations described in FIGS. 1-5. The logic 608, or a portion thereof, may also be configured as processing logic or logic, at least a portion of which is partially implemented in hardware. The logic 608, or a portion thereof, may further be transmitted or received over a network via the network interface 612. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

Figure 7:
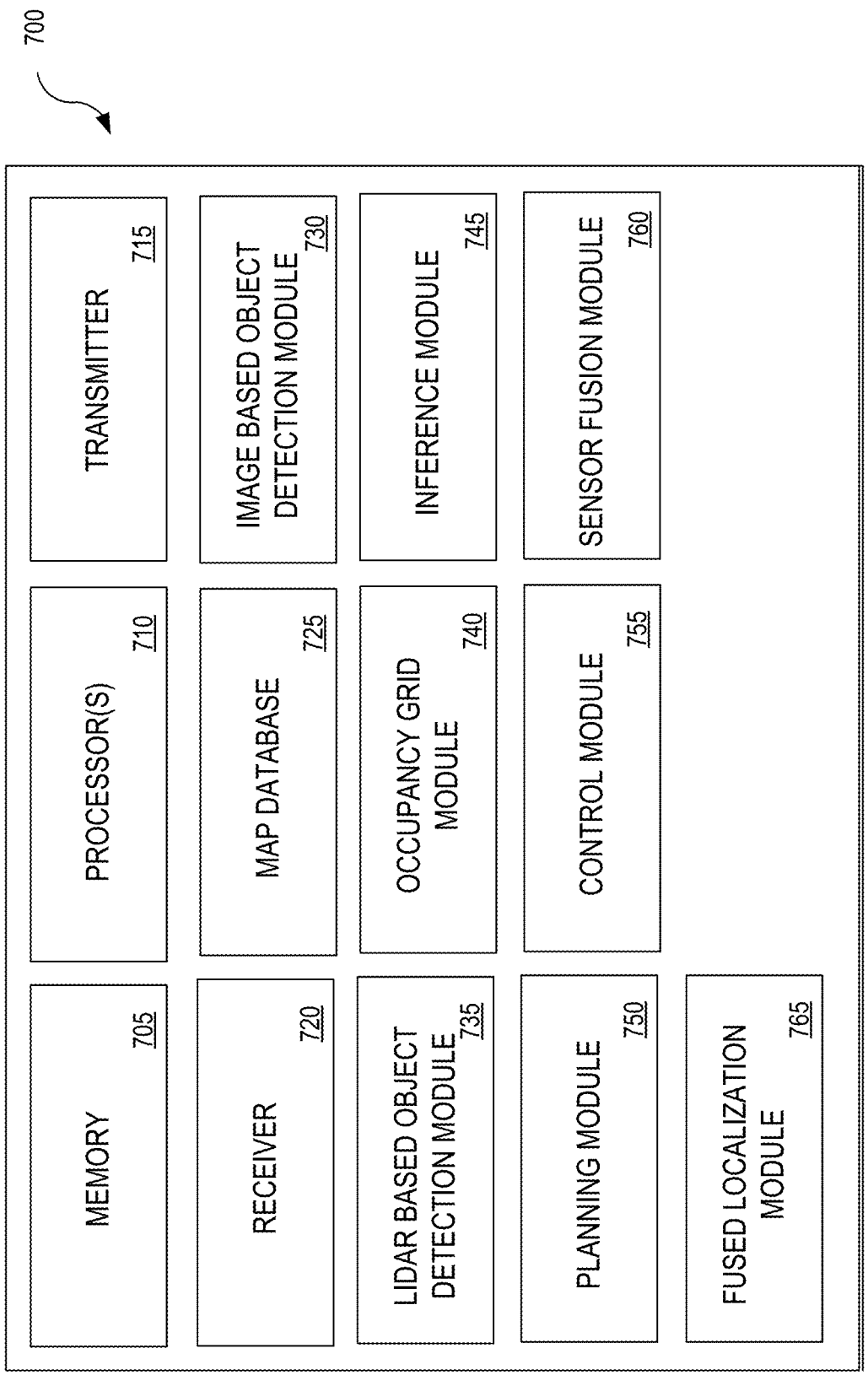
FIG. 7 shows an exemplary block diagram of a computer included in an autonomous vehicle.

FIG. 7 shows an exemplary block diagram a computer 700 of an individual computing system of the DCVCU included in an autonomous vehicle. FIG. 7 shows multiple modules in the computer 700 for ease of showing the multiple modules. In some embodiments, distributed computing may be performed by operating multiple computers 700, where each computer 700 include at least some of the modules shown in FIG. 7. The computer 700 includes at least one processor 710 and a memory 705 having instructions stored thereupon. The instructions upon execution by the processor 710 configure the computer 700 and/or the various modules of the computer 700 to perform the operations described in FIGS. 1 to 3 and in the various embodiments described in this patent document. The transmitter 715 transmits or sends information or data to one or more devices in the autonomous vehicle. For example, a transmitter can send an instruction to one or more motors of the steering wheel to steer the autonomous vehicle. The receiver 720 receives information or data transmitted or sent by one or more devices. For example, the receiver 720 receives a status of the current speed from the odometer sensor or the current transmission gear from the transmission.

Developments in autonomous driving technology have led to a development of semi-trailer truck that can be autonomously driven to deliver goods to a destination. A semi-trailer truck is a vehicle that can include a tractor unit where a driver sits in a cab and a trailer unit coupled to the tractor unit. The trailer unit may include goods that the semi-trailer truck delivers to a destination. When a semi-trailer trucks is driven in an autonomous mode, the semi-trailer truck can operate without much intervention from a human driver.

A computer, or a collection of computers, located in the semi-trailer truck can operate the semi-trailer truck in an autonomous mode by controlling various system of the semi-trailer truck. For example, the computer can perform image processing and/or signal processing on images obtained from cameras and/or point cloud data from LIDAR sensors located on the semi-trailer truck to determine the location of objects that surround the semi-trailer truck. Based on the image and/or signal processing, the computer can safely operate the semi-trailer truck by controlling a steering angle of the steering system, a throttle amount to control the speed of the vehicle, a transmission gear, and/or a braking amount to control the extent to which the brakes are engaged.

To safely operate the semi-trailer truck in an autonomous mode, several sensors are distributed around the semi-trailer truck so that the sensors are coupled to different places on the semi-trailer truck. For example, a plurality of cameras is coupled to a roof of a cab of the semi-trailer truck and a plurality of sensors (e.g., LIDARs) are coupled to the hood of the semi-trailer truck. Sensors located at different places on the semi-trailer truck enable a computer located in the semi-trailer truck to obtain sensor data that describes different regions (e.g., front, rear, side) of an environment in which the semi-trailer truck is being driven.

Autonomous vehicles depend in part on the software that controls the operation of various devices in the autonomous vehicles for autonomous navigation. The present disclosure describes techniques that may be used by various embodiments for maintaining and updating individual software modules of an autonomous vehicle control system. The describes techniques can beneficially improve software-based control of autonomous vehicles.

Figure 8:
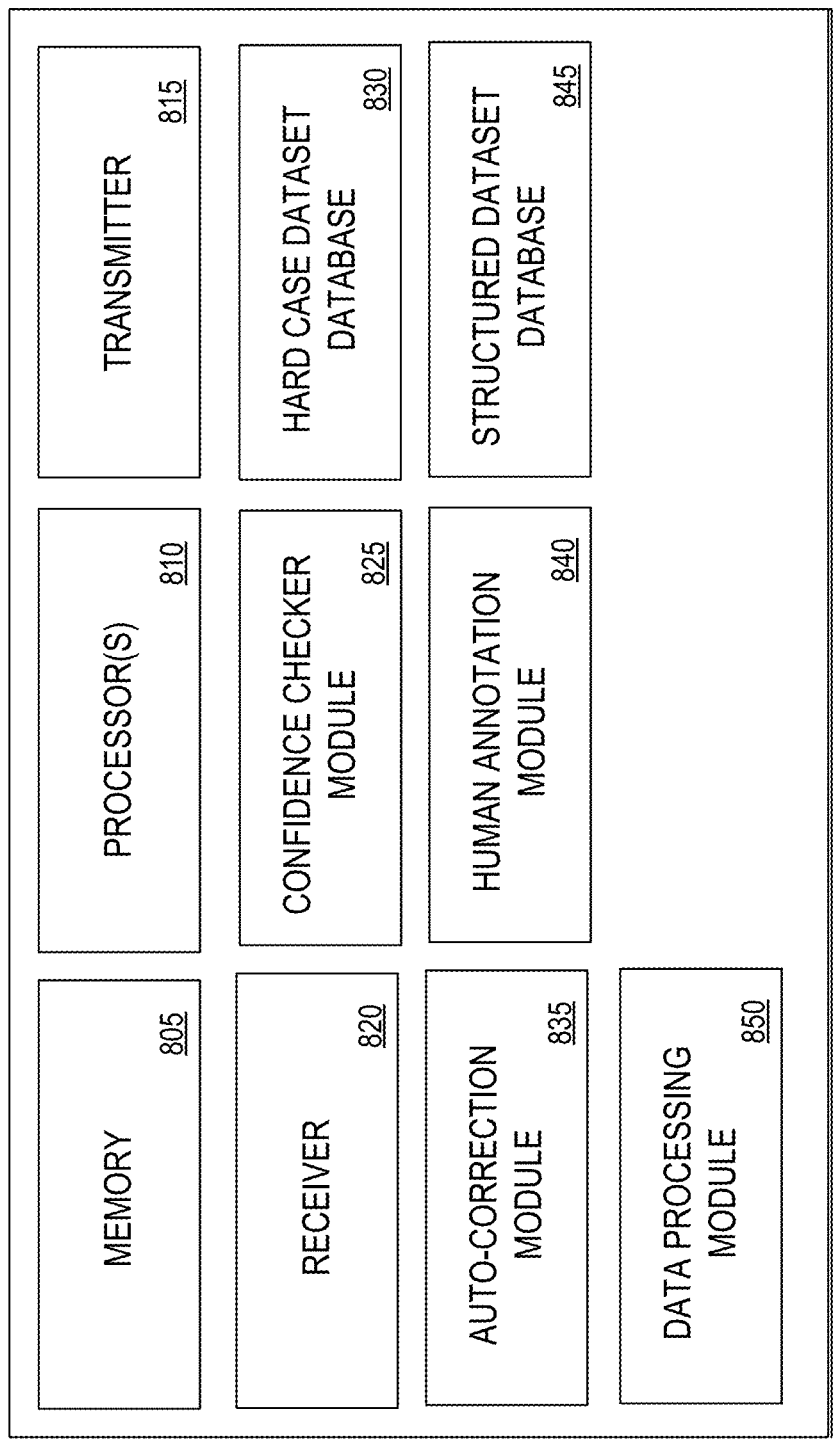
FIG. 8 shows an exemplary block diagram of a computer that improves software that operates in an autonomous vehicle.

FIG. 8 shows an exemplary block diagram of a computer 800 that improves software that operates in an autonomous vehicle, such as one that may execute the method shown in FIG. 4. The computer 800 includes at least one processor 810 and a memory 805 having instructions stored thereupon. The instructions upon execution by the processor 810 configure the computer 800 and/or the various modules of the computer 800 to perform the operations described in FIGS. 1 and 4 to 5 and in the various embodiments described in this patent document. The transmitter 815 and receiver 820 may send and receive information, respectively.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A system for autonomous vehicle operation, comprising:
   a first computer comprising a first processor configured to perform a first set of operations, the first processor is configured to:
   receive, from a camera located on an autonomous vehicle, an image of an area towards which the autonomous vehicle is driven;
   receive, from a light detection and ranging (LIDAR) located on the autonomous vehicle, point cloud data of the area;
   receive, from a second camera located on the autonomous vehicle, a second image of at least part of the area;

determine that a first set of one or more moving objects or one or more static obstacles from the image is same as a second set of one or more moving objects or one or more static obstacles from the second image;
combine the first set and the second set, wherein moving objects and static obstacles comprise a combination of the first set and the second set;
determine, at least from the image and the point cloud data, locations of the moving objects and the static obstacles in the area; and
determine, based on a stored map and the locations of the static obstacles, a drivable region in the area, wherein the drivable region indicates a region where the autonomous vehicle is allowed to be driven;
a second computer comprising a second processor configured to perform a second set of operations, the second processor is configured to:
determine, based at least on the drivable region and the locations of the moving objects, a trajectory information for the autonomous vehicle; and
send, to at least one device located in the autonomous vehicle, an instruction comprising one or more values that are determined based at least on the trajectory information, and wherein the autonomous vehicle is driven according to the trajectory information based on the instruction sent to operate the at least one device.

2. The system of claim 1, wherein the second processor of the second computer is configured to determine, based on the trajectory information and based on a location and an orientation of the autonomous vehicle, the one or more values for operating at least one device located in the autonomous vehicle.

3. The system of claim 1, wherein the second processor of the second computer is further configured to:
track a location of at least one moving object based on a detection of the at least one moving object in the received image and one or more additional images received from the camera, wherein the one or more additional images are received in time after the image is received.

4. The system of claim 1, wherein the first processor of the first computer and the second processor of the second computer are configured to perform respective operations based on an autonomous driving software model that assigns the first set of operations to the first computer and the second set of operations to the second computer.

5. The system of claim 1, wherein the second processor of the second computer is further configured to:
determine a motion pattern of at least one moving object after the image is received from the camera,
wherein the motion pattern indicates a predicted trajectory of the at least one moving object based at least on a determination of speeds and directions of movement of the moving objects.

6. The system of claim 1, wherein the second processor of the second computer is further configured to:
determine an area next to a road to safely park the autonomous vehicle in case of an emergency.

7. A method of autonomous driving operation, comprising:
performing a first set of operations by a first computer, the first set of operations comprising:
receiving, from a camera located on an autonomous vehicle, an image of an area towards which the autonomous vehicle is driven;
receiving, from a light detection and ranging (LIDAR) located on the autonomous vehicle, point cloud data of the area;
receiving, from a second camera located on the autonomous vehicle, a second image of at least part of the area;
determining that a first set of one or more moving objects or one or more static obstacles from the image is same as second set of one or more moving objects or one or more static obstacles from the second image;
combining the first set and the second set, wherein moving objects and static obstacles comprise a combination of the first set and the second set;
determining, at least from the image and the point cloud data, locations of the moving objects and the static obstacles in the area; and
determining, based on a stored map and the locations of the static obstacles, a drivable region in the area, wherein the drivable region indicates a region where the autonomous vehicle is allowed to be driven; and
performing a second set of operations by a second computer, the second set of operations comprising:
determining, based at least on the drivable region and the locations of the moving objects, a trajectory information for the autonomous vehicle; and
sending, to at least one device located in the autonomous vehicle, an instruction comprising one or more values that are determined based at least on the trajectory information, and wherein the autonomous vehicle is driven according to the trajectory information based on the instruction sent to operate the at least one device.

8. The method of claim 7, wherein the second set of operations further include:
determining motion patterns of the moving objects over a pre-determined length of time after the image is received from the camera,
wherein the motion patterns indicates predicted trajectories of the moving objects based on:
detecting the moving objects, and
determining speeds and directions of movement of the moving objects.

9. The method of claim 8, wherein the second set of operations further include:
assigning, to the moving objects, situational tags that describe the motion patterns of the moving objects.

10. The method of claim 9, wherein at least one situation tag for at least one moving object includes a speed of the at least one moving object and a location of the at least one moving object.

11. The method of claim 9, wherein at least one situation tag for at least one moving object includes an indication of whether the at least one moving object is speeding up or slowing down.

12. The method of claim 9, wherein the trajectory information for the autonomous vehicle is determined based on the drivable region, the locations of the moving objects, one or more attributes of the moving objects, the situational tags for the moving objects, and the locations of the static obstacles.

13. A non-transitory computer readable program storage medium having code stored thereon, the code, when executed by a processor, causing the processor to implement a method comprising:
performing a first set of operations by a first computer, the first set of operations comprising:

receiving, from a camera located on an autonomous vehicle, an image of an area towards which the autonomous vehicle is driven;

receiving, from a light detection and ranging (LIDAR) located on the autonomous vehicle, point cloud data of the area;

receiving, from a second camera located on the autonomous vehicle, a second image of at least part of the area;

determining that a first set of one or more moving objects or one or more static obstacles from the image is same as second set of one or more moving objects or one or more static obstacles from the second image;

combining the first set and the second set, wherein moving objects and static obstacles comprise a combination of the first set and the second set;

determining, at least from the image and the point cloud data, locations of the moving objects and the static obstacles in the area; and determining, based on a stored map and the locations of the static obstacles, a drivable region in the area, wherein the drivable region indicates a region where the autonomous vehicle is allowed to be driven; and performing a second set of operations by a second computer, the second set of operations comprising:

determining, based at least on the drivable region and the locations of the moving objects, a trajectory information for the autonomous vehicle; and sending, to at least one device located in the autonomous vehicle, an instruction comprising one or more values that are determined based at least on the trajectory information, and wherein the autonomous vehicle is driven according to the trajectory information based on the instruction sent to operate the at least one device.

14. The non-transitory computer readable program storage medium of claim 13, wherein the trajectory information is filtered by applying a filter to the trajectory information.

15. The non-transitory computer readable program storage medium of claim 14, wherein the filter includes a Kalman filter configured to minimize noise in the trajectory information.

16. The non-transitory computer readable program storage medium of claim 13, wherein the one or more values determined based at least on the trajectory information includes determining a steering angle of a steering of the autonomous vehicle.

17. The non-transitory computer readable program storage medium of claim 13, wherein the one or more values determined based at least on the trajectory information includes determining a throttle amount for an engine of the autonomous vehicle.

18. The non-transitory computer readable program storage medium of claim 13, wherein the one or more values determined based at least on the trajectory information includes determining a transmission gear for a transmission of the autonomous vehicle.

19. The non-transitory computer readable program storage medium of claim 13, wherein the one or more values determined based at least on the trajectory information includes determining a braking amount of brakes of the autonomous vehicle.

20. The non-transitory computer readable program storage medium of claim 13, wherein the second set of operations further include:

determining a motion pattern of at least one moving object after the image is received from the camera, wherein the motion pattern indicates a predicted trajectory of the at least one moving object based at least on a determination of speeds and directions of movement of the moving objects.

* * * * *

UNITED STATES PATENT AND TRADEMARK OFFICE
CERTIFICATE OF CORRECTION

PATENT NO. : 11,702,108 B2
APPLICATION NO. : 17/019135
DATED : July 18, 2023
INVENTOR(S) : Charles A. Price et al.

It is certified that error appears in the above-identified patent and that said Letters Patent is hereby corrected as shown below:

In the Specification

In Column 1, Line 38, delete "itself" and insert -- itself. --, therefor.

In Column 2, Line 15, delete "same a" and insert -- same as --, therefor.

In Column 4, Line 47, delete "DRAWING" and insert -- DRAWINGS --, therefor.

In Column 5, Line 42, delete "II an" and insert -- II is an --, therefor.

In Column 13, Line 23, delete "applying" and insert -- apply --, therefor.

In Column 13, Line 39, delete "used detect" and insert -- used to detect --, therefor.

In Column 14, Line 1, delete "least computer" and insert -- least one computer --, therefor.

In Column 14, Line 39, delete "same a" and insert -- same as --, therefor.

In Column 18, Line 13, delete "least computer" and insert -- least one computer --, therefor.

In Column 18, Line 63, delete "vehicle" and insert -- vehicle. --, therefor.

Signed and Sealed this
Nineteenth Day of September, 2023

Katherine Kelly Vidal
*Director of the United States Patent and Trademark Office*